United States Patent
Kim et al.

(10) Patent No.: US 7,420,595 B2
(45) Date of Patent: Sep. 2, 2008

(54) IMAGE SENSOR FOR DETECTING FLICKER NOISE AND METHOD THEREOF

(75) Inventors: Ki-Yong Kim, Ichon-shi (KR); Chan-Ki Kim, Ichon-shi (KR)

(73) Assignee: Magnachip Semiconductor, Ltd. (KR)

( * ) Notice: Subject to any disclaimer, the term of this patent is extended or adjusted under 35 U.S.C. 154(b) by 833 days.

(21) Appl. No.: 10/879,556

(22) Filed: Jun. 28, 2004

(65) Prior Publication Data

US 2005/0238259 A1    Oct. 27, 2005

(30) Foreign Application Priority Data

Apr. 27, 2004    (KR) .................. 10-2004-0029016

(51) Int. Cl.
*H04N 9/73*    (2006.01)
(52) U.S. Cl. .................................. 348/226.1
(58) Field of Classification Search .............. 348/226.1, 348/227.1, 228.1
See application file for complete search history.

(56) References Cited

U.S. PATENT DOCUMENTS

| | | | |
|---|---|---|---|
| 6,295,085 B1 * | 9/2001 | Munson et al. | 348/226.1 |
| 6,630,953 B1 * | 10/2003 | Toyoda et al. | 348/226.1 |
| 6,710,818 B1 * | 3/2004 | Kasahara et al. | 348/226.1 |
| 2002/0097328 A1 * | 7/2002 | Henderson et al. | 348/241 |
| 2004/0080630 A1 * | 4/2004 | Kim | 348/226.1 |
| 2004/0165084 A1 * | 8/2004 | Yamamoto et al. | 348/226.1 |

FOREIGN PATENT DOCUMENTS

JP        2004135347 A    *    4/2004

* cited by examiner

*Primary Examiner*—Lin Ye
*Assistant Examiner*—Jason Whipkey
(74) *Attorney, Agent, or Firm*—Blakely, Sokoloff, Taylor & Zafman (57) ABSTRACT

An image sensor has improved functions so as to automatically eliminate a flicker noise. For the purpose, the image sensor includes a pixel array for capturing information about an image provided from the outside and having N pixel rows and M pixel columns for maximizing a feature of reacting to light, wherein M and N are integers, respectively, a flicker noise detective pixel unit containing X pixel rows, which has a form extended from the N pixel rows of the pixel array, and M pixel columns, wherein each pair of X pixel rows has an identical exposure time and X is an even number, and a flicker noise for controlling an exposure point for the flicker noise detective pixel unit and detecting the flicker noise by using outputs of the flicker noise detective pixel unit.

18 Claims, 6 Drawing Sheets

IMAGE SENSOR FOR DETECTING FLICKER NOISE AND METHOD THEREOF

FIELD OF THE INVENTION

The present invention relates to an image sensor and a method for detecting a flicker noise of the image sensor, which has improved functions so as to automatically eliminate the flicker noise.

BACKGROUND OF THE INVENTION

In general, an image sensor is a device of displaying images by using a feature that a semiconductor reacts to light. That is, the image sensor reads out electrical values by detecting lightness and wavelengths of different lights derived from different objects. The image sensor makes the electric values to levels able to be signal-processed.

The image sensor is a semiconductor device of changing an optical image to electrical values. A charge-coupled device (CCD) is a device in which MOS capacitors are located very close to one another and charge, carriers are stored at the capacitors. On the other hand, a Complementary Metal Oxide Semiconductor (CMOS) image sensor uses CMOS technology which utilizes a control circuit and a signal processing circuit as peripheral circuits, employs MOS transistors as many as the number of pixels and adopts a switching scheme of detecting outputs sequentially by using the MOS transistors. The CMOS image sensor is used in personal portable systems such as a mobile phone since it consumes low power. Therefore, the image sensors are used in various areas of PC camera, medical instrument, toy and so on.

Figure 1:
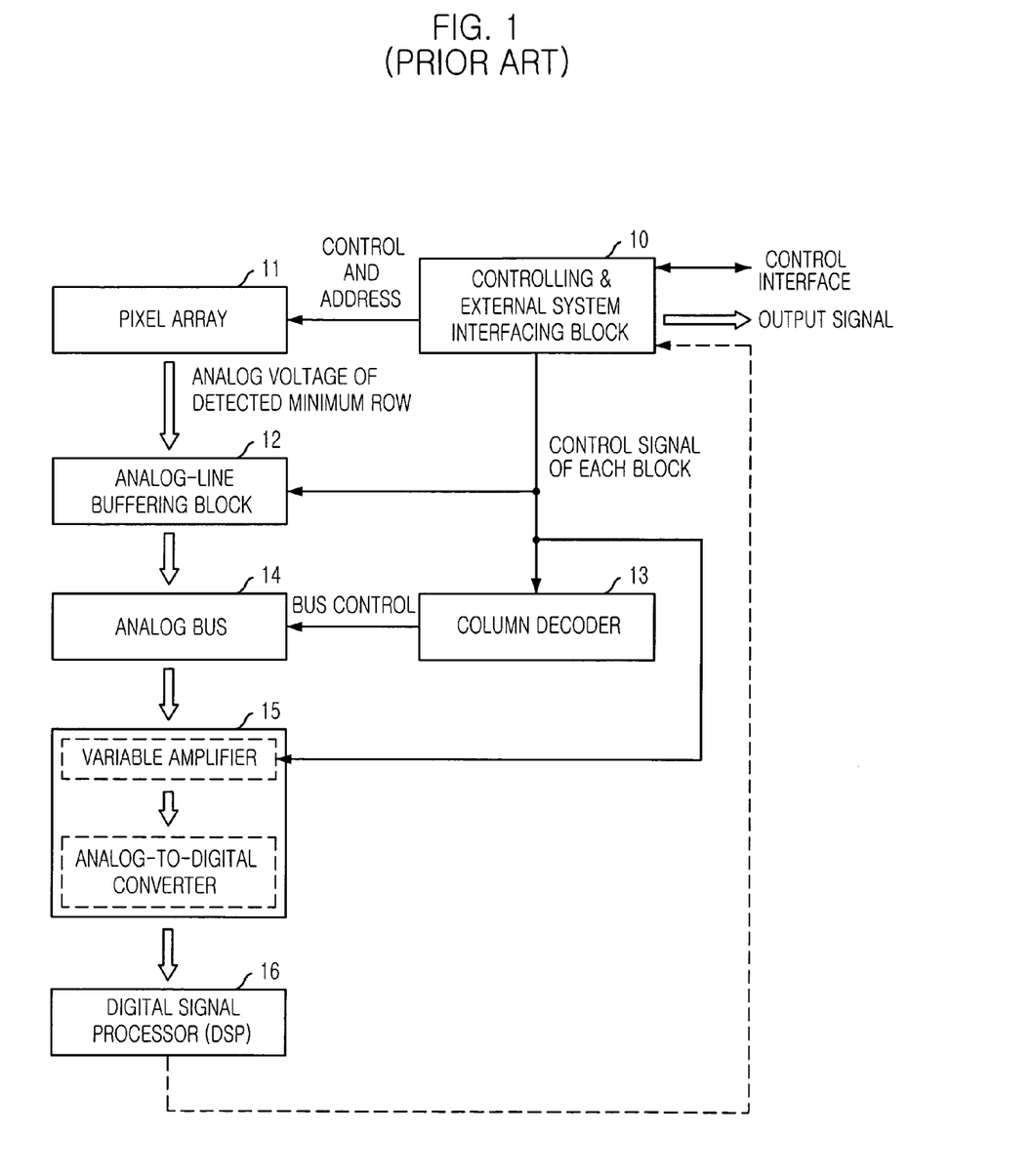
FIG. 1 is a block diagram of a conventional image sensor.

FIG. 1 is a block diagram showing a conventional image sensor.

Referring to FIG. 1, the image sensor includes a controlling & external system interfacing block 10, a pixel array 11, an analog-line buffering block 12, a column decoder 13, an analog bus 14, an analog signal processor (ASP) 15 and a digital signal processor (DSP) 16.

The ASP 15 contains a variable amplifier and an analog-to-digital converter (ADC) and the DSP 16 performs functions of error correction, color interpolation, gamma correction, color space conversion and so on.

Hereinafter, an operation of each component constructing the above image sensor will be explained in detail.

The pixel array 11 contains N×M pixels for maximizing a feature of reacting to light, N and M being integers, respectively, and is a core part of the image sensor for detecting information about images provided from the outside.

The controlling & external system interfacing block 10 controls a whole operation of the image sensor by using a finite state machine (FSM) and performs an interfacing operation for an external system. Since the block 10 includes an arrangement register (not shown), it is possible to program information related to various internal operations and the whole operation of the image sensor is controlled by the programmed information.

The analog-line buffering block 12 detects voltages of pixels on a selected one row and stores the detected voltages therein. Among the analog data stored in the analog-line buffering block 12, a data on a column chosen by the column decoder 13 is transferred to the variable amplifier in the ASP 15 through the analog bus 14.

The variable amplifier, e.g., a programmable gain amplifier (PGA), amplifies pixel voltages stored in the analog-line buffering block 12 when the pixel voltages are low. The analog data amplified at the variable amplifier are color-corrected and then converted to digital values at the ADC. The digital values are converted again according to video standards such as 4:2:2 or 4:4:4 at the DSP 16 after being processed by the above procedure.

Meanwhile, in the image sensor, a fixed pattern noise can occur by an offset voltage due to a minute difference in a manufacturing process. In order to compensate this fixed pattern noise, the image sensor adopts a correlated double sampling (CDS) scheme to read a reset voltage signal and a data voltage signal from each pixel of the pixel array 11 and output a difference between the reset voltage signal and the data voltage signal.

Application of the image sensor is still-camera, personal computer (PC) camera, medical, toy, and portable terminal and so on. If light sources are different, there occurs a flicker noise. Since, however, the greater part of application requires an image sensor usable without regard to a kind of light source, the image sensor needs a function of automatically eliminating the flicker noise.

The CMOS image sensor captures images by adjusting its exposure time to light. Therefore, if the exposure time is integer times of a frequency of a light source, there is no problem. However, if the exposure time is different from the frequency of the light source, in case of the CMOS image sensor capturing image data on a line-by-line basis, since the amount of light that each line receives is different, there occurs a flicker noise making a noise bar on a final image.

FIGS. 2A to 2E show graphs illustrating various cases in which flicker effects happen.

Figure 2A:
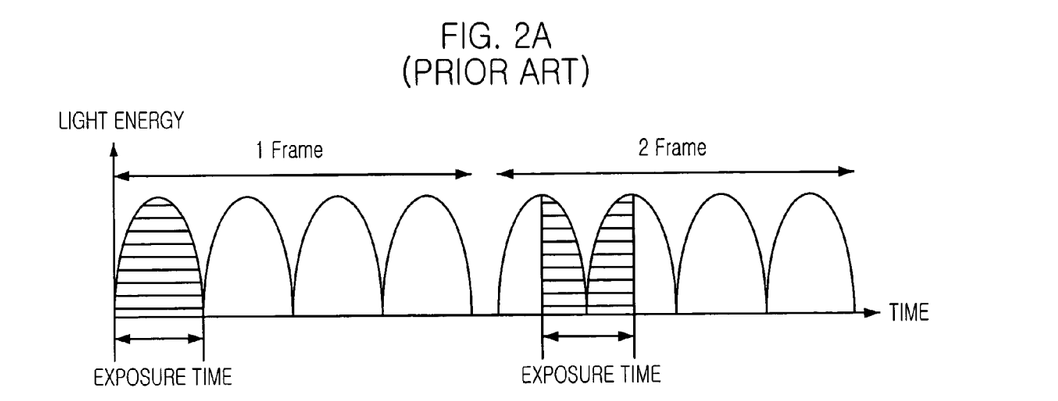
FIGS. 2A to 2E are graphs illustrating various cases in which flicker effects happen.

Referring to FIG. 2A, there is described the variation of light energy according to the change of time in case that the amount of inputted light, i.e., energy, has an identical frequency to that of the exposure time of the image sensor. In this case, since the amount of energy that each line receives is identical, a normal image is outputted.

Figure 2B:
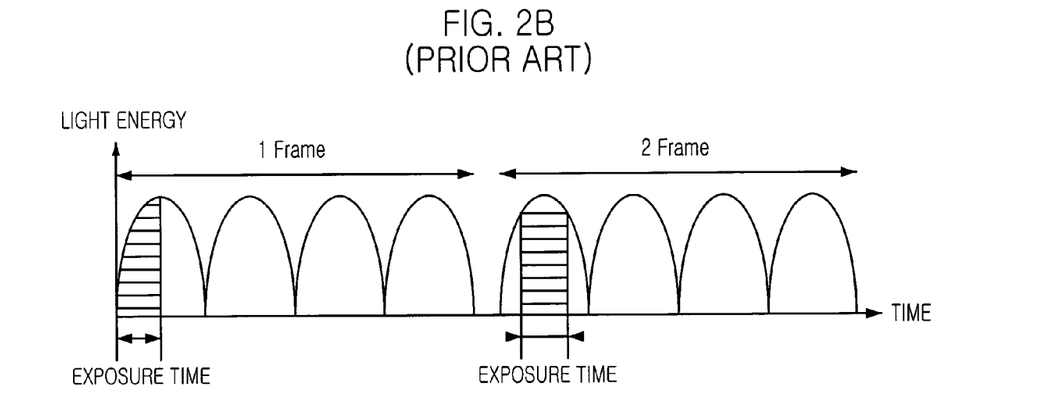

FIG. 2B shows the energy having a different frequency from the exposure time, i.e., a case that the exposure time is shorter than a frequency of the light source. In other words, it shows a case that the frequency of the energy is longer than the exposure time, i.e., the energy changes in a shorter time period.

Figure 2C:
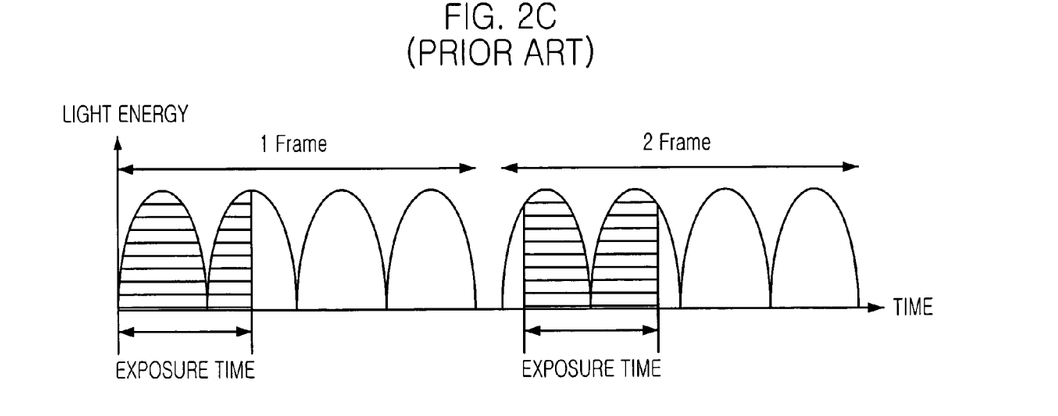

FIG. 2C shows a case that the frequency of the energy is shorter than the exposure time, i.e., the energy changes in a longer time period. In any case, there occurs flicker in the image. Specially, when there occurs a flicker noise, a noise bar generated on the image flows upward or downward, or the noise bar is fixed in the image. At this time, the fixed flicker noise is difficult to be distinguished with a real image.

Figure 2D:
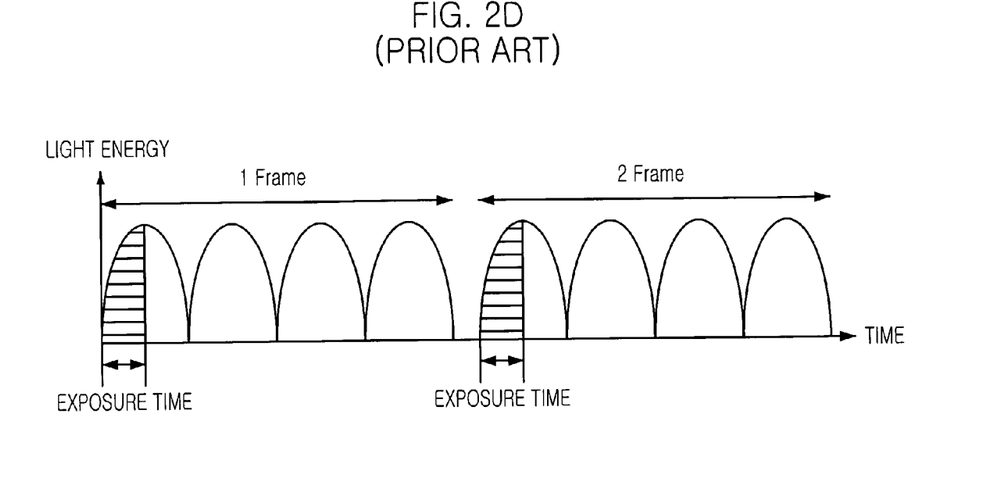
Figure 2E:
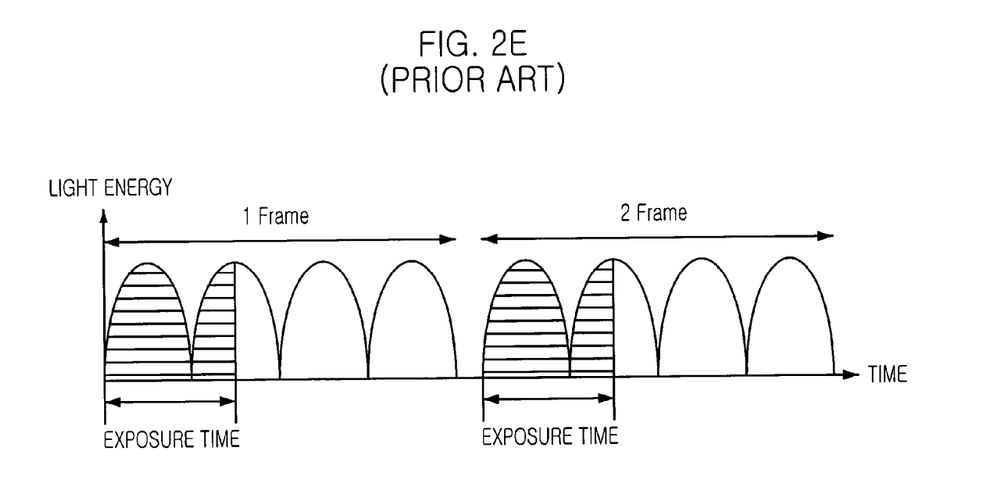

FIGS. 2D and 2E represent cases that there occur flicker noises fixed in the image. In these cases, sizes of flicker noises occurring in a first frame and a second frame are identical regardless of the relation between the exposure time and the frequency of the light source. In case that the fixed flicker noises are generated, if detecting the flicker noises by using a flicker noise of a different size for each frame as in an existing algorithm, it is impossible to detect the flicker noises.

Therefore, as afore-mentioned, there needs to eliminate flicker for every case that the flicker occurs.

SUMMARY OF THE INVENTION

It is, therefore, an object of the present invention to provide an image sensor and a flicker noise detecting method capable of automatically eliminating flicker noises for every case that there occur the flicker noises.

In accordance with one aspect of the present invention, there is provided an image sensor including a pixel array for capturing information about an image provided from the outside and having N pixel rows and M pixel columns for maximizing a feature of reacting to light, wherein M and N are integers, respectively, a flicker noise detective pixel unit containing X pixel rows, which has a form extended from the N pixel rows of the pixel array, and M pixel columns, wherein each pair of X pixel rows has an identical exposure time and X is an even number, and a flicker noise for controlling an exposure point for the flicker noise detective pixel unit and detecting the flicker noise by using outputs of the flicker noise detective pixel unit.

In accordance with another aspect of the present invention, there is provided a method for detecting a flicker noise of an image sensor, comprising the steps of: (a) securing information about images of a first pair of pixel rows by differing exposure points of the first pair of pixel rows having a first exposure time and repeating the image information securing process as changing the exposure points of the first pair of pixel rows; (b) capturing information about images of a second pair of pixel rows by differing exposure points of the second pair of pixel rows having a second exposure time and repeating the image information capturing process as changing the exposure points of the second pair of pixel rows; (c) calculating an average value of the image information for each pixel row of the first and the second pairs of pixel rows in every image information detecting process; (d) ciphering a maximum value and a minimum value among average values for said each pixel row obtained from the step (c); (e) determining a first subtract value by subtracting the minimum value from the maximum value of one pixel row having the first exposure time, deciding a second subtract value by subtracting the minimum value from the maximum value of the other pixel row having the first exposure time, and outputting a smaller one of the first subtract value and the second subtract value as a first minimum subtract value; (f) determining a third subtract value by subtracting the minimum value from the maximum value of one pixel row having the second exposure time, deciding a fourth subtract value by subtracting the minimum value from the maximum value of the other pixel row having the second exposure time, and outputting a smaller one of the third subtract value and the fourth subtract value as a second minimum subtract value; and (g) deciding an exposure time corresponding to the flicker noise by comparing the first minimum subtract value and the second minimum subtract value.

In accordance with further another aspect of the present invention, there is provided a method for detecting a flicker noise of an image sensor, comprising the steps of: (a) securing information about an image of each of a first and a second pixel row by differing exposure points of the first and the second pixel rows having a first exposure time and repeating the image information securing process as changing the exposure points of the first and the second pixel rows; (b) capturing information about an image of each of a third and a fourth pixel row by differing exposure points of the third and the fourth pixel rows having a second exposure time and repeating the image information capturing process as changing the exposure points of the third and the fourth pixel rows; (c) calculating an average value of the image information for each of the first to the fourth pixel rows in every image information detecting process; (d) ciphering a maximum value and a minimum value among average values for said each of the first to the fourth pixel rows obtained from the step (c); (e) determining a first subtract value by subtracting the minimum value from the maximum value of the first pixel row, deciding a second subtract value by subtracting the minimum value from the maximum value of the second pixel row, and outputting a smaller one of the first subtract value and the second subtract value as a first minimum subtract value; (f) determining a third subtract value by subtracting the minimum value from the maximum value of the third pixel row, deciding a fourth subtract value by subtracting the minimum value from the maximum value of the fourth pixel row, and outputting a smaller one of the third subtract value and the fourth subtract value as a second minimum subtract value; and (g) deciding an exposure time corresponding to the flicker noise by comparing the first minimum subtract value and the second minimum subtract value.

In accordance with the present invention, it is possible to automatically eliminate flicker in every case that a flicker noise occurs. For this, the present invention can control on/off of an exposure time for each line. In accordance with the present invention, there are added dedicated lines for the flicker detection to an existing pixel array, wherein the dedicated lines are independently operated with regard to functions of the pixel array and an exposure time of each dedicated line is artificially on/off to compensate a conventional noise detecting scheme. As a result, it is possible to detect flicker noises for most of cases.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

In the following detailed description, the preferred embodiments of the present invention are set forth in order to provide a thorough understanding of the invention with reference to the drawings. However, it will be understood by those skilled in the art that the present invention may be practiced without these preferred embodiments.

A flicker effect happens when a frequency of a light source is different from an exposure time of an image sensor. The light source is a luminous body used in everyday life. The sun and a fluorescent lamp are also light sources. In case of using the sunlight as the light source, since its frequency is very high and the exposure time is always more than thousands of times of a sunlight period, there does not occur the flicker effect under the sunlight. On the other hand, in case of using the fluorescent lamp as the light source, since its frequency is 50 Hz or 60 Hz, there occurs the flicker effect in an image sensor having the exposure time of dozens of ms.

Since a CMOS image sensor reads each line so as to capture image data from pixels, it uses various methods for eliminating flicker. Since an identical exposure time is applied to each line, if the exposure time is different from a frequency of a light source, the amount of energy made at each line by the light source becomes different from the exposure time. As a result, the different amount of energy is inputted and there occurs flicker.

In accordance with the present invention, a basic flicker phenomenon as well as a specific flicker phenomenon can be detected automatically. The flicker phenomenon represent a phenomenon by which there is generated a noise bar on an image. In a general case, since the noise bar on the image flows upward or downward, it can be definitely distinguished with a figure on the image. However, if a frame length becomes integer times of the frequency of the light source, the noise bar on the image does not flow upward or downward and looks like a check, making the flicker detection difficult. In accordance with the present invention, this phenomenon is also detected.

Figure 3:
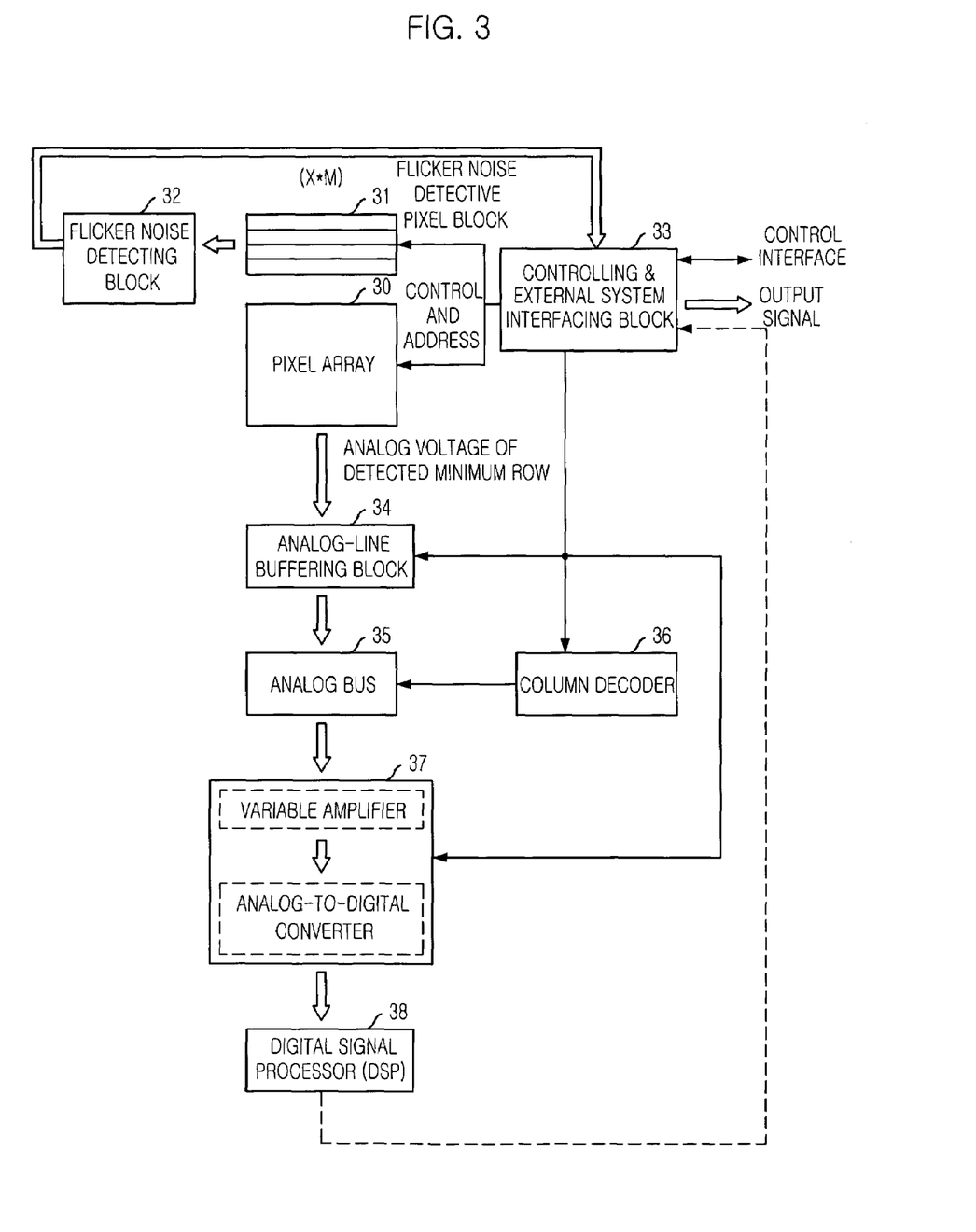
FIG. 3 provides a block diagram of an image sensor in accordance with the present invention.

FIG. 3 provides a block diagram of an image sensor in accordance with the present invention.

Referring to FIG. 3, an inventive image sensor includes a pixel array 30 that contains N×M pixels for maximizing a feature of reacting to light, N and M being integers, respectively, and detects information about images provided from the outside, a flicker noise detective pixel block 31 that contains X pixel rows, which has a form extended from the N pixel rows of the pixel array 30, and M pixel columns, X being an even number larger than N, and whose each pair of pixel rows has an identical exposure time, a flicker noise detecting block 32 for controlling an exposure point of the flicker noise detective pixel block 31 and detecting a flicker noise based on outputs of the flicker noise detective pixel block 31, a controlling & external system interfacing block 33, an analog-line buffering block 34, a column decoder 36, an analog bus 35, an analog signal processor (ASP) 37, and a digital signal processor (DSP) 38.

The ASP 37 contains a variable amplifier and an analog-to-digital converter (ADC) and the DSP 38 performs functions of error correction, color interpolation, gamma correction, color space conversion and so on.

Hereinafter, an operation of each component constructing the inventive image sensor will be explained in detail.

The pixel array 30 contains N×M pixels for maximizing a feature of reacting to light, N and M being integers, respectively, and is a core part of the image sensor for detecting information about images provided from the outside.

The flicker noise detective pixel block 31 detects information for an image during one frame to allow each pair of rows to have different exposure points from each other and, in a next frame, detects information for the image after changing the exposure points of each pair of rows. That is, for a plurality of frames, it detects the image information as changing the exposure points of each pair of rows.

The controlling & external system interfacing block 33 controls a whole operation of the image sensor by using a finite state machine (FSM) and performs an interfacing operation for an external system. Since the block 33 includes an arrangement registers (not shown), it is possible to program information related to various internal operations and the whole operation of the image sensor is controlled by the programmed information.

The analog-line buffering block 34 detects voltages of pixels on a selected row and stores the detected voltages therein. Among the analog data stored in the analog-line buffering block 34, a data on a column chosen by the column decoder 36 is transferred to the variable amplifier in the ASP 37 through the analog bus 35.

The variable amplifier, e.g., a programmable gain amplifier (PGA), amplifies pixel voltages stored in the analog-line buffering block 34 when the pixel voltages are low. The analog data amplified at the variable amplifier are color-corrected and then converted to digital values at the ADC. The digital values are converted again according to video standards such as 4:2:2 or 4:4:4 at the DSP 38 after being processed by the above procedure.

Meanwhile, in the image sensor, a fixed pattern noise can occur by an offset voltage due to a minute difference in a manufacturing process. In order to compensate this fixed pattern noise, the image sensor adopts a correlated double sampling (CDS) scheme to read a reset voltage signal and a data voltage signal from each pixel of the pixel array 30 and output a difference between the reset voltage signal and the data voltage signal.

As can be seen from the construction in FIG. 3, the inventive image sensor includes the flicker noise detective pixel block 31 for only detecting flicker, e.g., 4 pixel lines, in addition to the pixel array 30 on which an image is practically displayed.

The flicker noise detecting block 32 receives outputs from the flicker noise detective pixel block 31 and certifies whether or not the flicker is generated. Based on the results, different exposure times are provided to rows.

Figure 4A:
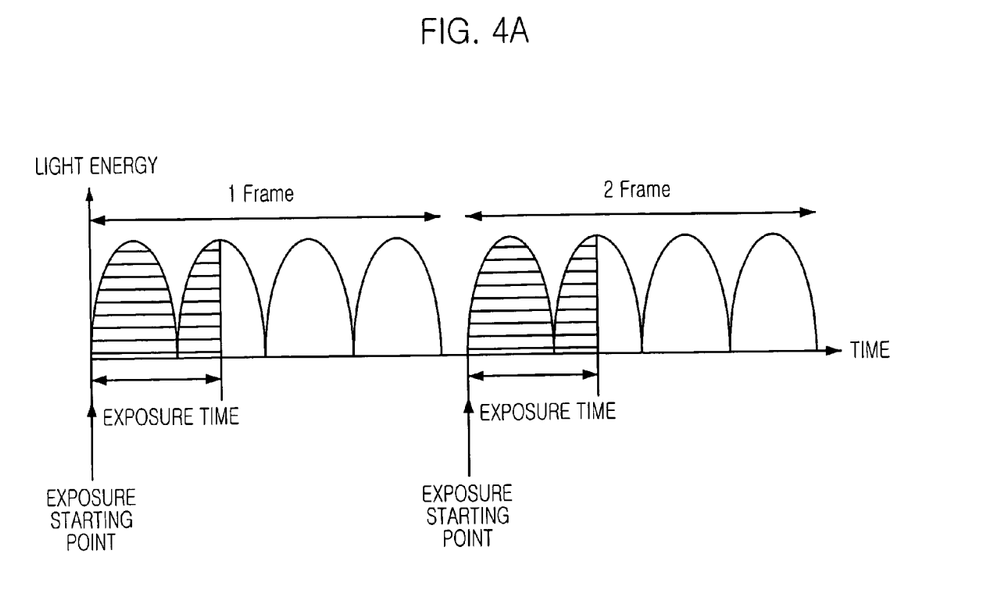
FIGS. 4A and 4B represent graphs describing two cases of detecting flicker as changing an exposure time when a frame length is integer times of a frequency of a light source.
Figure 4B:
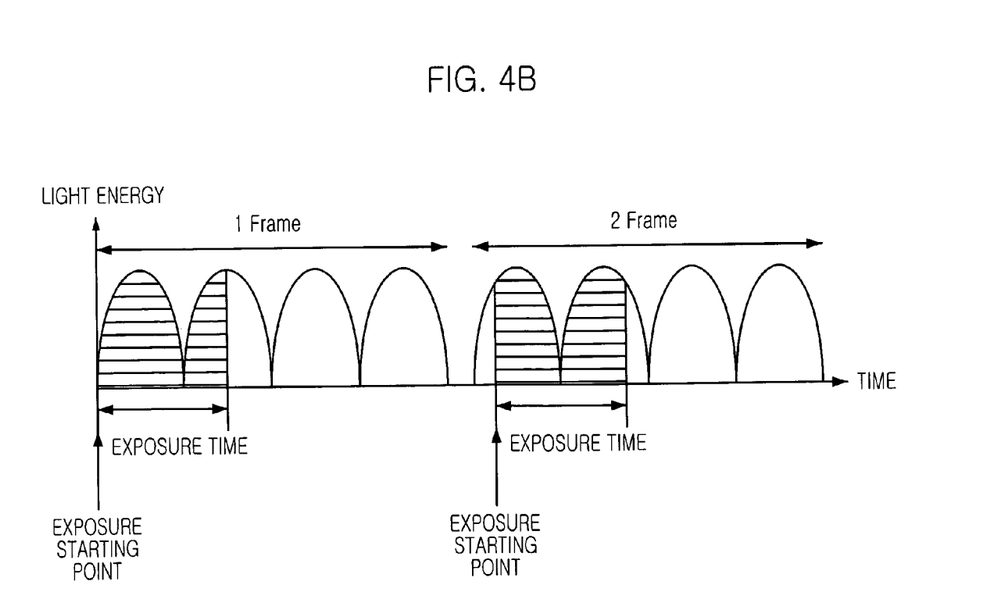

FIGS. 4A and 4B represent graphs describing two cases of detecting flicker as changing an exposure time when a frame length is integer times of a frequency of a light source.

Referring FIG. 4A, there is shown why it is impossible to detect the flicker when the frame length is integer times of the frequency of the light source. When comparing two frames in which flicker occurs, in case that the frame length is not integer times of the frequency of the light source, the amount of energy of the first frame is different from that of the second frame since the light source has a different frequency from the exposure time.

Therefore, the occurrence of flicker is detected by comparing the amount of energies of two frames. However, in case that the frequency of the light source becomes integer times of the frame length, although data of lines at the same place of the first and the second frames are applied by different exposure times of the light source, it is difficult to detect the occurrence of flicker since the amount of energies inputted to the sensor during the sensor being exposed to the lines become identical.

Therefore, in order to detect the flicker, it is required to adopt different exposure timing.

In FIG. 4B, there is shown an example of adopting different exposure timing. If the exposure timing is differently set up for each line, it is possible to detect the flicker although the frame length becomes integer times of the frequency of the light source.

Hereinafter, there is described an inventive flicker noise detecting algorithm. In accordance with the present invention, by adjusting the exposure timing; it is possible to detect the flicker noise in case that the frame length becomes integer times of the frequency of the light source.

It is assumed that there are a pair of pixel rows, A1 and A2, having an exposure time 't1' corresponding to a light source A and a pair of pixel rows, B1 and B2, having an exposure time 't2' corresponding to a light source B.

At first, information about images of corresponding rows A1 and A2 is detected by differing their exposure points. For instance, if the exposure point of A1 is a ¼ point of a wavelength of the light source A, the exposure point of A2 is decided as a ¾ point of the wavelength of the light source A. Then, this process is repeated as changing the exposure point of each pixel.

At this time, information about images of corresponding rows B1 and B2 is detected by differing their exposure points. For example, if the exposure point of B1 is a ¼ point of a wavelength of the light source B, the exposure point of B2 is determined as a ¾ point of the wavelength of the light source A. This process is repeated as changing the exposure point of each pixel.

Then, there is ciphered an average value of the information about the image of each pixel row for each time. After repeating plural times the average value ciphering process, a minimum value and a maximum value are determined by comparing a plurality of average values of each pixel row. A first subtract value is calculated by subtracting the minimum value from the maximum value of the pixel row A1 having the exposure time 't1'. Likewise, a second subtract value is ciphered by subtracting the minimum value from the maximum value of the pixel row A2 having the exposure time 't1'. A smaller one of the first subtract value and the second subtract value is determined as a first minimum subtract value.

A third subtract value is calculated by subtracting the minimum value from the maximum value of the pixel row B1 having the exposure time 't2'. Likewise, a fourth subtract value is ciphered by subtracting the minimum value from the maximum value of the pixel row B2 having the exposure time 't2'. A smaller one of the third subtract value and the fourth subtract value is decided as a second minimum subtract value.

After then, an exposure time corresponding to the flicker noise is determined according to sizes of the first minimum subtract value and the second minimum subtract value.

When deciding the exposure time corresponding to the flicker noise, an exposure time having a larger one of the first minimum subtract value and the second minimum subtract value corresponds to the flicker noise and a light source corresponding to an exposure time having a smaller one is a real light source.

The first minimum subtract value and the second minimum subtract value are larger than a signal conversion minimum value for preventing an error operation due to the minute variation of an external environment. For each pixel row, information about an image is detected at a certain exposure time and an average value of each pixel row is calculated.

In the meantime, the above one time for each pixel row corresponds to one frame of the pixel array in the image sensor.

Figure 5:
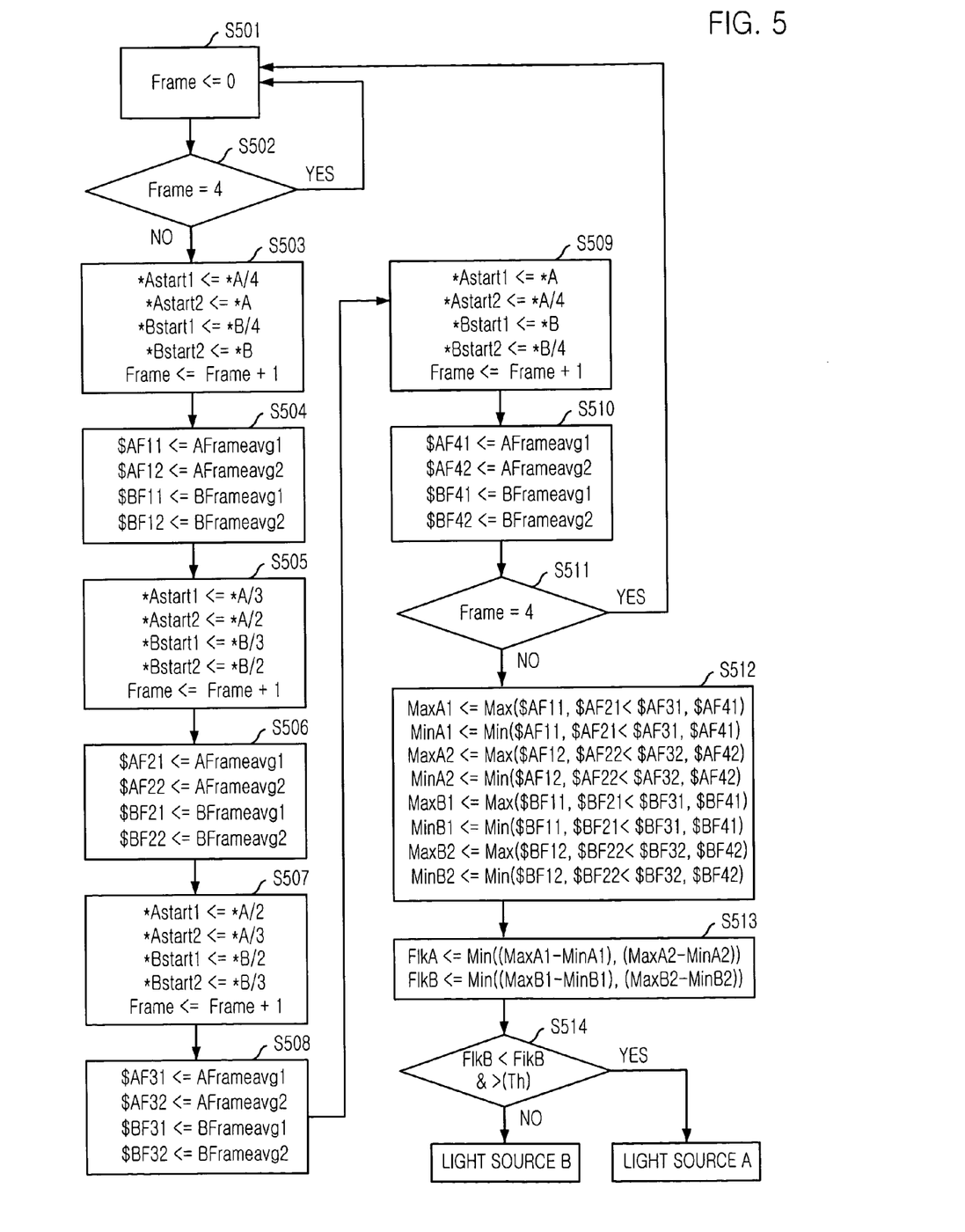
FIG. 5 describes a flow chart of an algorithm for detecting flicker in accordance with an embodiment of the present invention.

FIG. 5 describes a flow chart of an algorithm for detecting flicker in accordance with an embodiment of the present invention.

In FIG. 5, there is shown a procedure of finding a real light source by using two pairs of pixel rows, i.e., 4 pixel rows, wherein the two pairs of pixel rows correspond to two light sources A and B, respectively. Hereinafter, a procedure of detecting a flicker noise is explained with reference to the drawing.

At first, it is assumed that there are a pair of pixel rows using the light source A, i.e., having an exposure time corresponding to the light source A and a pair of pixel rows using the light source B, i.e., having an exposure time corresponding to the light source B, i.e., total 4 pixel rows extended from rows in a pixel array so as to detect the flicker noise.

Each of the 4 pixel rows for detecting the flicker noise outputs one data for one frame reading out whole data of the pixel array. Therefore, there are outputted total 16 data from the 4 pixel rows by repeating the data reading process during 4 frames.

In step 'S501', a current frame is set to '0' and a pixel data of a first frame is outputted.

In step 'S502', it is determined whether or not a current output data is of a fourth frame and, if the current frame is not the fourth frame, the next frame starts to be exposed. If the current frame is the fourth frame, this procedure goes back to step 'S501' and the current frame is set to '0' again.

If it is determined that the current frame is not the fourth frame in step 'S502', the next frame starts to be exposed. Therefore, in step 'S503', the pixel row A1 using the light source A is exposed at a ¼point of a wavelength of the light source A, i.e., '*Astart1<=*A/4'. The pixel row A2 using the light source A is exposed at a 4/4point of the wavelength of the light source A, i.e., '*Astart2<=*A'. The pixel row B1 using the light source B is exposed at a ¼point of a wavelength of the light source B, i.e., '*Bstart1<=*B/4'. The pixel row B2 using the light source B is exposed at a 4/4point of the wavelength of the light source B, i.e., '*Bstart2<=*B'. At each exposure point, image information of the corresponding pixel row is captured.

In step 'S504', there is calculated an average value of the image information for each of the four pixel rows obtained during processing a frame corresponding to step 'S503'.

That is, an average value of the first frame for the pixel row A1 is calculated as '$AF11<=AFrameavg1'; that for the pixel row A2, as '$AF12<=AFrameavg2'; that for the pixel row B1, as '$BF11<=BFrameavg1'; and that for the pixel row B2, as '$BF12<=BFrameavg2'.

In step 'S505', the pixel row A1 using the light source A is exposed at a ¾point of the wavelength of the light source A, i.e., '*Astart1<=*A/3'. The pixel row A2 using the light source A is exposed at a ⅔ point of the wavelength of the light source A, i.e., '*Astart2<=*A/2'. The pixel row B1 using the light source B is exposed at a ¾point of the wavelength of the light source B, i.e., '*Bstart1<=*B/3'. The pixel row B2 using the light source B is exposed at a ⅔ point of the wavelength of the light source B, i.e., '*Bstart2<=*B/2'. At each exposure point, image information of the corresponding pixel row is secured.

In step 'S506', there is calculated an average value of the image information for each of the four pixel rows obtained during processing a frame corresponding to step 'S505'.

Namely, an average value of the second frame for the pixel row A1 is calculated as '$AF21<=AFrameavg1'; that for the pixel row A2, as '$AF22<=AFrameavg2'; that for the pixel row B1, as '$BF21<=BFrameavg1'; and that for the pixel row B2, as '$BF22<=BFrameavg2'.

In step 'S507', the pixel row A1 using the light source A is exposed at a ⅔ point of the wavelength of the light source A, i.e., '*Astart1<=*A/2'. The pixel row A2 using the light source A is exposed at a ¾ point of the wavelength of the light source A, i.e., '*Astart2<=*A/3'. The pixel row B1 using the light source B is exposed at a ⅔ point of the wavelength of the light source B, i.e., '*Bstart1<=*B/2'. The pixel row B2 using the light source B is exposed at a ¾point of the wavelength of the light source B, i.e., '*Bstart2<=*B/3'. At each exposure point, image information of the corresponding pixel row is obtained.

In step 'S508', there is calculated an average value of the image information for each of the four pixel rows obtained during processing a frame corresponding to step 'S507'.

That is to say, an average value of the third frame for the pixel row A1 is calculated as '$AF31<=AFrameavg1'; that for the pixel row A2, as '$AF32<=AFrameavg2'; that for the pixel row B1, as '$BF31<=BFrameavg1'; and that for the pixel row B2, as '$BF32<=BFrameavg2'.

In step 'S509', the pixel row A1 using the light source A is exposed at a 4/4 point of the wavelength of the light source A, i.e., '*Astart1<=*A'. The pixel row A2 using the light source A is exposed at a ¼ point of the wavelength of the light source A, i.e., '*Astart2<=*A/4'. The pixel row B1 using the light source B is exposed at a ¼ point of the wavelength of the light source B, i.e., '*Bstart1<=*B'. The pixel row B2 using the light source B is exposed at a ¼ point of the wavelength of the light source B. i.e., '*Bstart2<=*B/4'. At each exposure point, image information of the corresponding pixel row is captured.

In step 'S510', there is calculated an average value of the image information for each of the four pixel rows obtained during processing a frame corresponding to step 'S509'.

That is, an average value of the second frame for the pixel row A1 is calculated as '$AF41<=AFrameavg1'; that for the pixel row A2, as '$AF42<=AFrameavg2'; that for the pixel row B1, as '$BF41<=BFrameavg1'; and that for the pixel row B2, as '$BF42<=BFrameavg2'.

In step 'S511', it is determined if the current frame is the fourth frame. If so, the procedure goes back to step 'S501' and the current frame is set to '0'.

In step 'S512', a minimum value and a maximum value are ciphered by using the 4 average values obtained for each of the pixel rows A1, A2, B1 and B2.

At this moment, the maximum value of the average values for the pixel row A1 is 'MaxA1<=Max($AF11, $AF21, $AF31, $AF41)' and its minimum value is 'MinA1<=Min ($AF11, $AF21, $AF31, $AF41)'.

The maximum value of the average values for the pixel row A2 is 'MaxA2<=Max($AF12, $AF22, $AF32, $AF42)' and its minimum value is 'MinA2<=Min($AF12, $AF22, $AF32, $AF42)'.

The maximum value of the average values for the pixel row B1 is 'MaxB1<=Max($BF11, $BF21, $BF31, $BF41)' and its minimum value is 'MinB1<=Min($BF11, $BF21, $BF31, $BF41)'.

The maximum value of the average values for the pixel row B2 is 'MaxB2<=Max($BF12, $BF22, $BF32, $BF42)' and its minimum value is 'MinB2<=Min($BF12, $BF22, $BF32, $BF42)'.

In step 'S513', a first subtract value for the pixel row A1 is calculated as 'MaxA1−MinA1'. A second subtract value for the pixel row A2 is ciphered as 'MaxA2−MinA2'. Then, after comparing the first and the second subtract values like 'FlkA<=Min(MaxA1−MinA1), (MaxA2−MinA2), the first minimum subtract value 'FlkA' is outputted as a smaller one of the first and the second subtract values.

Likewise, a third subtract value for the pixel row B1 is calculated as 'MaxB1−MinB1'. A fourth subtract value for the pixel row B2 is ciphered as 'MaxB2−MinB2'. Then, after comparing the third and the fourth subtract values like 'FlkB<=Min(MaxB1−MinB1), (MaxB2−MinB2), the second minimum subtract value 'FlkB' is outputted as a smaller one of the third and the fourth subtract values.

In step 'S514', an exposure time corresponding to the flicker noise is determined by comparing the sizes of the first minimum subtract value 'FlkA' and the second minimum subtract value 'FlkB'.

In this case, the flicker noise is a light source corresponding to an exposure time having a longer one of the first minimum subtract value 'FlkA' and the second minimum subtract value 'FlkB' and the real light source is a light source corresponding to an exposure time having a smaller one.

The first minimum subtract value 'FlkA' and the second minimum subtract value 'FlkB' should be larger than a signal conversion minimum value 'Th' for preventing an error operation due to the minute variation of an external environment.

In other words, in the operation of FIG. 5, among the four lines for detecting the flicker noise, one pair of lines is applied with an exposure time having a different frequency from the other pair of lines. Pixel rows having an identical exposure time are exposed at different points from each other. In a next frame, they are exposed at different points from in the previous frame. In this case, the exposure time is not changed.

In case of changing the exposure time and the exposure point, if the frequency of the light source and the exposure time are different, an output value of each line outputted from each frame is different from those of other lines and, thus, it is possible to detect the flicker exactly.

For more accurate flicker detection, two lines among the four lines have a different exposure time from the rest two lines. As a result, four resulting values are obtained from each of the four lines and total 16 resulting values are secured from the four lines.

At first, a maximum value and a minimum value are obtained by comparing first lines of the four frames. Likewise, respective maximum values and minimum values are secured from the second lines, the third lines and the fourth lines of the four frames. For the four lines, a smaller value between two lines applied by the light source A becomes 'FlkA' and a smaller value between two lines applied by the light source B becomes 'FlkB'. A smaller value between 'FlkA' and 'FlkB' represents a current light source.

If the flicker is detected, the exposure time is automatically changed applicable to the current light source, thereby eliminating the flicker phenomenon.

As described above, in accordance with a preferred embodiment of the present invention, it is noticed that the flicker noise can be detected in case a frame length is integer times of a frequency of a light source by classifying pixel lines automatically eliminating the flicker noise occurring by the difference of the light source into pairs of pixel lines having different light sources and applying different exposure timing to each pair of pixel lines.

Therefore, in accordance with the present invention, it is possible to eliminate the flicker noise and improve the quality of image by automatically distinguishing a frequency of a light source without regard to a kind of flicker occurring in the image and applying an appropriate exposure time.

The present application contains subject matter related to Korean patent application No. 2004-29016, filed in the Korean Patent Office on Apr. 27, 2004, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. A method for detecting a flicker noise of an image sensor, comprising the steps of:
 (a) securing information about images of a first pair of pixel rows by differing exposure points of the first pair of pixel rows having a first exposure time and repeating the image information securing process as changing the exposure points of the first pair of pixel rows;
 (b) capturing information about images of a second pair of pixel rows by differing exposure points of the second pair of pixel rows having a second exposure time and repeating the image information capturing process as changing the exposure points of the second pair of pixel rows;
 (c) calculating an average value of the image information for each pixel row of the first and the second pairs of pixel rows in every image information detecting process;

(d) ciphering a maximum value and a minimum value among average values for said each pixel row obtained from the step (c);

(e) determining a first subtract value by subtracting the minimum value from the maximum value of one pixel row having the first exposure time, deciding a second subtract value by subtracting the minimum value from the maximum value of the other pixel row having the first exposure time, and outputting a smaller one of the first subtract value and the second subtract value as a first minimum subtract value;

(f) determining a third subtract value by subtracting the minimum value from the maximum value of one pixel row having the second exposure time, deciding a fourth subtract value by subtracting the minimum value from the maximum value of the other pixel row having the second exposure time, and outputting a smaller one of the third subtract value and the fourth subtract value as a second minimum subtract value; and (g) deciding an exposure time corresponding to the flicker noise by comparing the first minimum subtract value and the second minimum subtract value.

2. The method as recited in claim 1, wherein, in the step (g), an exposure time having a larger one of the first minimum subtract value and the second minimum subtract value is determined as the flicker noise.

3. The method as recited in claim 1, wherein, in the step (g), a light source corresponding to an exposure time having a smaller one of the first minimum subtract value and the second minimum subtract value is decided as a real light source.

4. The method as recited in claim 2, wherein, in the step (g), a light source corresponding to an exposure time having a smaller one of the first minimum subtract value and the second minimum subtract value is decided as a real light source.

5. The method as recited in claim 3, wherein the first minimum subtract value and the second minimum subtract value are larger than a signal conversion minimum value for preventing an error operation due to minute variation of an external environment.

6. The method as recited in claim 4, wherein the first minimum subtract value and the second minimum subtract value are larger than a signal conversion minimum value for preventing an error operation due to minute variation of an external environment.

7. The method as recited in claim 1, wherein the image information for each pixel row is obtained at one exposure point to thereby cipher the average value.

8. The method as recited in claim 1, wherein one time of the image information detecting process corresponds to one frame.

9. A method for detecting a flicker noise of an image sensor, comprising the steps of:

(a) securing information about an image of each of a first and a second pixel row by differing exposure points of the first and the second pixel rows having a first exposure time and repeating the image information securing process as changing the exposure points of the first and the second pixel rows;

(b) capturing information about an image of each of a third and a fourth pixel row by differing exposure points of the third and the fourth pixel rows having a second exposure time and repeating the image information capturing process as changing the exposure points of the third and the fourth pixel rows;

(c) calculating an average value of the image information for each of the first to the fourth pixel rows in every image information detecting process;

(d) ciphering a maximum value and a minimum value among average values for said each of the first to the fourth pixel rows obtained from the step (c);

(e) determining a first subtract value by subtracting the minimum value from the maximum value of the first pixel row, deciding a second subtract value by subtracting the minimum value from the maximum value of the second pixel row, and outputting a smaller one of the first subtract value and the second subtract value as a first minimum subtract value;

(f) determining a third subtract value by subtracting the minimum value from the maximum value of the third pixel row, deciding a fourth subtract value by subtracting the minimum value from the maximum value of the fourth pixel row, and outputting a smaller one of the third subtract value and the fourth subtract value as a second minimum subtract value; and (g) deciding an exposure time corresponding to the flicker noise by comparing the first minimum subtract value and the second minimum subtract value.

10. The method as recited in claim 9, wherein, in the step (g), an exposure time having a larger one of the first minimum subtract value and the second minimum subtract value is determined as the flicker noise.

11. The method as recited in claim 9, wherein, in the step (g), a light source corresponding to an exposure time having a smaller one of the first minimum subtract value and the second minimum subtract value is decided as a real light source.

12. The method as recited in claim 10, wherein, in the step (g), a light source corresponding to an exposure time having a smaller one of the first minimum subtract value and the second minimum subtract value is decided as a real light source.

13. The method as recited in claim 11, wherein the first minimum subtract value and the second minimum subtract value are larger than a signal conversion minimum value for preventing an error operation due to minute variation of an external environment.

14. The method as recited in claim 12, wherein the first minimum subtract value and the second minimum subtract value are larger than a signal conversion minimum value for preventing an error operation due to minute variation of an external environment.

15. The method as recited in claim 9, wherein the image information for each of the first to the fourth pixel rows is obtained at one exposure point to thereby cipher the average value.

16. The method as recited in claim 9, wherein one time of the image information detecting process corresponds to one frame.

17. The method as recited in claim 16, wherein the step of detecting information about an image of each of two pixel rows by differing exposure points of the two pixel rows and repeating the image information detecting process is performed for 4 frames.

18. An image sensor comprising:

a pixel array for capturing information about an image provided from the outside and having N pixel rows and M pixel columns for maximizing a feature of reacting to light, wherein M and N are integers, respectively;

a flicker noise detective pixel unit containing X pixel rows, which has a form extended from the N pixel rows of the pixel array, and M pixel columns, wherein each pair of X pixel rows has an identical exposure time and X is an even number; and a flicker noise for controlling an exposure point for the flicker noise detective pixel unit and detecting the flicker noise by using outputs of the flicker noise detective pixel unit, wherein the flicker noise detective pixel unit secures the image information during one frame by making one pair of rows have different exposure points from each other, captures the image information during a next frame by differing the exposure points of the rows and performs its operation by varying the exposure points of the rows during a plurality of frames.

* * * * *